United States Patent [19]

Robertson

[11] 4,169,065

[45] Sep. 25, 1979

[54] EAR CLEANING MIXTURE FOR CANINE

[76] Inventor: Richard D. Robertson, 186 Blackwell Rd., Pennington, N.J. 08534

[21] Appl. No.: 848,504

[22] Filed: Nov. 4, 1977

[51] Int. Cl.$^2$ .............................. C11D 7/18; C11D 7/50
[52] U.S. Cl. .................................. 252/104; 252/95; 252/96; 252/100; 252/153; 252/547; 252/DIG. 14
[58] Field of Search .................. 252/95, 96, 100, 104, 252/547, 153, DIG. 14; 424/338

[56] References Cited

U.S. PATENT DOCUMENTS

| | | | |
|---|---|---|---|
| 3,194,768 | 7/1965 | Lindner et al. | 252/186 |
| 3,607,760 | 9/1971 | McIntyre | 252/104 |
| 3,852,210 | 12/1974 | Krezanoski | 252/95 |
| 3,864,271 | 2/1975 | Stalter | 252/99 |
| 3,956,159 | 5/1976 | Jones | 252/104 |
| 3,970,575 | 7/1976 | Barrett | 252/95 |
| 4,051,059 | 9/1977 | Bowing et al. | 252/186 |

FOREIGN PATENT DOCUMENTS

| | | |
|---|---|---|
| 51-18228 | 2/1976 | Japan. |
| 976511 | 11/1964 | United Kingdom. |

OTHER PUBLICATIONS

"The Chemical Formulary", Bennett, H., Chemical Publishing Co., New York, vol. III, p. 127, copy in 166.

*Primary Examiner*—P. E. Willis, Jr.
*Attorney, Agent, or Firm*—David S. Woronoff

[57] ABSTRACT

A mixture for cleaning ears of pets, especially dogs, containing a mixture of alcohol, acetic acid, peroxide, soap in a water base.

4 Claims, No Drawings

EAR CLEANING MIXTURE FOR CANINE

BACKGROUND OF THE INVENTION

1. Field of the Invention

The present invention relates to a cleaning mixture for pet's ears especially dog's ears. The problem of keeping dog's ears clean and thereby preventing canine ear infection results from the convoluted ear structure of the dog which has been made even more exaggerated by modern breeding of dogs.

PRIOR ART

One known cleaning solution for pet's ears and more particularly for dog's ears use oil or oil-like materials. Such solutions are not particularly effective in dissolving the oils and fats present in the dog's ears. Further such oils and oil-like materials tend to leave a residue in the ear which will not evaporate and which will promote the adherence to the ear of dust particles which may find their way into the ear.

Another commonly used solution for cleaning pet's ears is undiluted denatured alcohol. Such an alcohol has the property of dissolving or adsorbing the natural oils and fats present at such a high degree that skin of the ear may be left excessively dry or even irritated enough to be in a sore and red condition.

Another commonly used material for cleaning dog's ears is Di Octyl Sodium sulfo-succinate which when used in conjunction with its other additives such as water or alcohol makes the waxes and oil miscible but is not sufficient to dissolve the oils and fats present in the ear sufficiently to be an effective help in preventing canine ear infection although it is a mild enough mixture not to cause irritation.

Other commonly used solutions are just water based fragrances which have no noticeable effect on canine ear hygiene.

SUMMARY OF THE INVENTION

The present invention relates to a novel mixture for use in cleaning the ears of pets especially dogs. The mixture may be formulated for use either daily or weekly with the relative concentrations being different for each intended use.

The basic mixture is a combination of alcohol, acetic acid, hydrogen peroxide, and soap, typically Benzethonium Chloride in a water base. It is to be understood that the word soap includes detergents of which benzethonium chloride is one type.

The mixture is applied directly in undiluted form to the dog's ear down to the drum and then may be either blotted out or shaken out by the dog. Any residue left in the ear will not be harmful to the animal.

DESCRIPTION OF THE PREFERRED EMBODIMENT

The present invention discloses a novel mixture for cleaning pet's ears especially canine ears. The ear canal of the modern dog is long, convoluted and runs both perpendicular and parallel to the horizon (normally) and therefore is not self-cleaning. See the illustration in *Current Veterinary Therapy* (Small Animal Practice), Vol. 4, page 487 published by W. B. Saunders & Co., Philadelphia, Pa.

Dogs, unlike cats which are very clean on their own, or other larger domesticated animals such as horses or cattle, are unable to keep their own ears sufficiently clean to prevent infection.

The modern dog has a more convoluted or closed ear canal now than did his ancestors due to extensive inbreeding.

The canine ear produces oils and fats or fatty acids naturally which are not self-removing. Ear waxes commonly found in dogs (70-80%) are olein, palmitin and stearin. The fatty acids which form oils in the ear are oleic, myristic and carnaubic. These substances, both fatty acids and waxes are commonly called cerumen.

To properly clean the ear it is desirable to have a solvent for the oils, a scrubber, an emulsifier (soap) to lower the surface tension of the dissolved materials, a solvent for the waxes, to change the pH to slightly acidic and to leave a pleasant fresh odor. It is also desirable to have a mixture which does not need to be rinsed or flushed out of the ear.

It has been found that a solution of the following appropriate ranges will achieve the desirable effects noted above:

Table 1

| Substance | Weekly Use % (Volume) | Daily Use |
|---|---|---|
| Alcohol | 1.0 to 35% | 1.0 to 6.1% |
| Acetic acid | 0.5-5% | 0.5 to 5% |
| Hydrogen Peroxide | 0.3 to 3% | 0.3 to 1% |
| (Soap) Benzethonium Chloride | 0.01-0.06% | 0.01 to 0.06% |
| Water | 98 to 57% | 98 to 88% |

The primary difference between the daily and weekly use mixtures is that the high concentration in the weekly use solution if used on a daily basis might cause irritation to the ear tissue. Excessive use of alcohol may leave the ear too dry. Used excessively, peroxide and acetic acid are likely to burn the ear.

In actual use in the ear, the alcohol (an organic base) is a solvent for the oils present such as oleic, myristic and carnaubic. The acetic acid makes the waxes more soluble; waxes suxh as oleic, palmitin and stearin. The soap which may preferably be benzethonium chloride is an emulsifier to help keep the mixture and the dissolved waxes and oils in the ear in solution. The hydrogen peroxide acts as a scrubbing agent and in cooperation with the soap forms bubbles which act to aid mechanically in the removal of the oils and waxes. The acetic acid leaves a small residue which is pleasant smelling and which has a mild anti-bacterial effect.

In use the mixture works effectively on dogs of all sizes and on dogs which have hair in their ears and those which do not. Other soaps than benzethonium chloride may be used but that soap has shown itself to be particularly effective.

What is claimed is:

1. A liquid composition consisting essentially of: a water base; emulsifier in the range of up to about 0.06% by volume; a hydrogen peroxide in the range of from about 0.3-3% by volume; acetic acid in the range of from about 0.5-5% by volume and alcohol solvent in a range of from about 1.0-35% by volume.

2. The composition in claim 1 wherein the emulsifier is benzethonium chloride in the range of about 0.01 to 0.06 by volume; hydrogen peroxide in the range of about 0.3 to 1.0 percent by volume; the acetic acid has a range of 0.5 to 5.0 percent by volume and the alcohol solvent has a ratio of about 1.0 to 6.0 percent by volume.

3. The composition in claim 1 wherein the emulsifier is benzethonium chloride in the range of about 0.01 to 0.06 percent by volume; hydrogen peroxide in the range of about 0.3 to 3.0 percent by volume; acetic acid in the range of about 0.5 to 5.0 percent by volume and alcohol solvent in the range of about 1 to 35 percent by volume.

4. The composition in claim 1 wherein the emulsifier is benzethonium chloride.

* * * * *